US007169742B2

(12) United States Patent
Sivik et al.

(10) Patent No.: US 7,169,742 B2
(45) Date of Patent: *Jan. 30, 2007

(54) PROCESS FOR THE MANUFACTURE OF POLYCARBOXYLIC ACIDS USING PHOSPHOROUS CONTAINING REDUCING AGENTS

(75) Inventors: Mark Robert Sivik, Mason, OH (US); Robb Richard Gardner, Cincinnati, OH (US); William Michael Scheper, Lawrenceburg, IN (US)

(73) Assignee: The Procter & Gamble Company, Cincinnati, OH (US)

( * ) Notice: Subject to any disclaimer, the term of this patent is extended or adjusted under 35 U.S.C. 154(b) by 256 days.

This patent is subject to a terminal disclaimer.

(21) Appl. No.: 10/267,296

(22) Filed: Oct. 9, 2002

(65) Prior Publication Data

US 2003/0074741 A1   Apr. 24, 2003

Related U.S. Application Data

(60) Provisional application No. 60/330,351, filed on Oct. 18, 2001.

(51) Int. Cl.
*C11D 11/00* (2006.01)
*C11D 3/36* (2006.01)
*C11D 3/37* (2006.01)

(52) U.S. Cl. .................. 510/361; 510/434; 510/467; 510/476; 510/477

(58) Field of Classification Search ............... 510/361, 510/434, 467, 476, 477
See application file for complete search history.

(56) References Cited

U.S. PATENT DOCUMENTS

| 2,243,765 A | 5/1941 | Morton |
|---|---|---|
| 2,243,786 A | 5/1941 | Udy |
| 2,541,457 A | 2/1951 | Beer |
| 3,215,488 A | 11/1965 | Suiter |
| 3,445,227 A | 5/1969 | Weinberger |
| 3,472,606 A | 10/1969 | Getchell et al. |
| 3,596,333 A | 8/1971 | Tsuruta et al. |
| 3,611,131 A | 10/1971 | Burkhart et al. |
| 3,660,013 A | 5/1972 | Payet et al. |
| 3,663,974 A | 5/1972 | Watanabe et al. |
| 3,841,832 A | 10/1974 | Swidler et al. |
| 3,886,204 A | 5/1975 | Geffers et al. |
| 3,960,482 A | 6/1976 | Payet |
| 4,032,294 A | 6/1977 | Thompson et al. |
| 4,046,707 A | 9/1977 | Smith et al. |
| 4,067,688 A | 1/1978 | Payet |
| 4,088,678 A | 5/1978 | Matt et al. |
| 4,104,022 A | 8/1978 | Payet |
| 4,108,598 A | 8/1978 | Payet |
| 4,331,797 A | 5/1982 | Martin |
| 4,336,024 A | 6/1982 | Denissenko et al. |
| 4,351,796 A | 9/1982 | Marshall |
| 4,396,390 A | 8/1983 | Hendrix et al. |
| 4,520,176 A | 5/1985 | Martin et al. |
| 4,530,874 A | 7/1985 | Hendrix et al. |
| 4,629,470 A | 12/1986 | Harper, Jr. |
| 4,743,266 A | 5/1988 | Harper, Jr. |
| 4,780,102 A | 10/1988 | Harper, Jr. |
| 4,792,619 A | 12/1988 | Berendt et al. |
| 4,820,307 A | 4/1989 | Welch et al. |
| 4,936,865 A | 6/1990 | Welch et al. |
| 4,975,209 A | 12/1990 | Welch et al. |
| 5,006,125 A | 4/1991 | Patton et al. |
| 5,018,577 A | 5/1991 | Pardue et al. |
| 5,122,158 A | 6/1992 | Kuroda et al. |
| 5,135,677 A | 8/1992 | Yamaguchi et al. |
| 5,205,836 A | 4/1993 | Hansen et al. |
| 5,221,285 A | 6/1993 | Andrews et al. |
| 5,242,463 A | 9/1993 | Blanchard et al. |
| 5,273,549 A | 12/1993 | Didier et al. |
| 5,298,634 A | 3/1994 | Connor et al. |
| 5,300,240 A | 4/1994 | Wilhelm et al. |
| 5,352,242 A | 10/1994 | Lammermann et al. |

(Continued)

FOREIGN PATENT DOCUMENTS

EP    0354648 A2    2/1990

(Continued)

OTHER PUBLICATIONS

Yang et al., "Nonformaldehyde Durable Press Finishing of Cotton Fabrics by Combining Citric Acid with Polymers of Maleic Acid", *Textile Research Journal*, Jun. 1998, vol. 68, No. 6, U.S.A.

Zeigler et al., Silicone Based Polymer Science: A Comprehensive Source, Advances in Chemistry Series #224, 1990, pp. 754-755, American Chemical Society, Washington, D. C.

B. Vonicina, Durable Press Finishing of Cotton with Polycarboxylic Acid, Fibres & Textiles in Eastern Europe, Jan.-Mar. 1996, pp. 69-71, Europe.

(Continued)

*Primary Examiner*—Brian Mruk
(74) *Attorney, Agent, or Firm*—Brahm J. Corstanje; Armina E. Matthews; Kim William Zerby

(57) ABSTRACT

A method for the production of polycarboxylic acids is provided via the present invention. The novel method herein comprises the steps of i) mixing a phosphorous containing reducing agent with at least one carboxylic acid monomer to form a reaction mixture; ii) adding an equivalent of base to the reaction mixture to provide a partially neutralized reaction mixture; and iii) adding a free radical generator to the partially neutralized reaction mixture under polymerization conditions to form a phospho/carboxylic acid polymer containing solution. Preferred monomers, reducing agents and free radical generators are also disclosed.

19 Claims, No Drawings

U.S. PATENT DOCUMENTS

| | | |
|---|---|---|
| 5,385,680 A | 1/1995 | Didier et al. |
| 5,386,038 A | 1/1995 | Davis et al. |
| 5,496,476 A | 3/1996 | Tang et al. |
| 5,496,477 A | 3/1996 | Tang et al. |
| 5,606,105 A | 2/1997 | Davis et al. |
| 5,695,528 A | 12/1997 | Komori et al. |
| 5,705,475 A | 1/1998 | Tang et al. |
| 5,728,771 A | 3/1998 | Tang et al. |
| 5,755,828 A | 5/1998 | Westland |
| 5,794,207 A | 8/1998 | Walker et al. |
| 5,849,039 A | 12/1998 | Sadlowski |
| 5,866,664 A | 2/1999 | McCallum, III et al. |
| 5,882,357 A | 3/1999 | Sun et al. |
| 5,885,303 A | 3/1999 | Payet |
| 5,891,972 A | 4/1999 | Egraz et al. |
| 5,965,517 A | 10/1999 | Mooney |
| 5,998,511 A | 12/1999 | Westland et al. |
| 6,020,297 A | 2/2000 | Austin et al. |
| 6,063,884 A | 5/2000 | Egraz et al. |
| 6,071,434 A | 6/2000 | Davis et al. |
| 6,136,916 A | 10/2000 | Arkens et al. |
| 6,165,919 A | 12/2000 | Yang |
| 6,184,271 B1 | 2/2001 | Westland et al. |
| 6,184,321 B1 | 2/2001 | Egraz et al. |
| 6,277,152 B1 | 8/2001 | Kyriazis et al. |
| 6,300,259 B1 | 10/2001 | Westland et al. |
| 6,309,565 B1 | 10/2001 | Stowell et al. |
| 2001/0018542 A1 | 8/2001 | Gerle et al. |

FOREIGN PATENT DOCUMENTS

| | | |
|---|---|---|
| EP | 0354648 A3 | 2/1990 |
| EP | 0354648 B1 | 6/1994 |
| EP | 0360747 B1 | 10/1995 |
| EP | 0491391 B1 | 5/1996 |
| EP | 0564346 B1 | 1/1997 |
| EP | 0569731 B1 | 12/1998 |
| EP | 976867 * | 2/2000 |
| EP | 0976867 A1 | 2/2000 |
| WO | WO 96/26314 A1 | 8/1996 |
| WO | WO 98/04772 | 2/1998 |
| WO | WO 98/31867 | 7/1998 |
| WO | WO 99/49124 | 9/1999 |
| WO | WO 99/49125 | 9/1999 |
| WO | WO 01/21677 A1 | 3/2001 |
| WO | WO 01/23663 A1 | 4/2001 |
| WO | WO 01/51496 A1 | 7/2001 |

OTHER PUBLICATIONS

Trask-Morrell et al., Evaluation of Polycarboxylic Acids as Durable Press Reactants Using Thermal and Mass Spectrometric Analyses Under Simulated Cure Conditions, Journal of Applied Polymer Science, 1999, pp. 230-234, New Orleans, LA, John Wiley & Sons, Inc.

Andrews et al., Finishing Additives in Treatment of Cotton Fabrics for Durable Press with Polycarboxylic Acids, Ind. Eng. Chem. Res., 1992, pp. 1981-1984, vol. 31, American Chemical Society.

C. M. Welch, Formaldehyde-Fre DP Finishing with Polycarboxylic Acid, American Dy stuff Reporter, Sep. 1994, pp. 19-26 & 132.

Lewis et al., Durable Press Finishing Of Cotton With Polycarboxylic Acids. I. Preparation of Thiosuccinyl-s-triazine, Journal of Applied Polymer Science, 1997, pp. 1465-1474, vol. 66, John Wiley & Sons, Inc.

Lewis et al., Durable Press Finishing of Cotton with Polycarboxylic Acids. II. Ester Crosslinking of Cotton with Dithiosuccinic Acid Derivative of S-Triazine, Journal of Applied Polymer Science, 1997, pp. 171-177, vol. 66, John Wiley & Sons, Inc.

Yang et al., Infared Spectroscopic Studies of the Nonformaldehyde Durable Press Finishing of Cotton Fabrics by Use of Polycarboxylic Acids, 1991, Journal of Applied Polym r Science, pp. 1609-1616, vol. 43, John Wiley & Sons, Inc.

Blanchard et al., Finishing with Modified Polycarboxylic Acid Systems For Dyeable Durable Press Cottons, 1991, vol. 23, pp. 25-28.

Welch et al., Curing Agents Having Low or Zero Phosphorus Content for Formaldehyde Free DP Finishing with Polycarboxylic Acids, 1993, vol. 25, pp. 25-29.

Schramm, et al. Kinetic Date for the Crosslinking Reaction of Polycarboxylic Acids with Cellulose, 1997, Institute for Textile Chemistry and Textile Physics, vol. 113, pp. 346-349.

Welch, et al, Mixed Polycarboxylic Acids and Mixed Catalyst in Formaldehyde-Free Durable Press Finishing, 1997, Textile Chemist and Colorist, vol. 29, pp. 22-27.

Trask-Morrell, et al, Thermoanalytical Study of Durable Press Reactant Levels on Cotton Fabrics, 1994, Textile Resource Journal, pp. 729-736.

* cited by examiner

PROCESS FOR THE MANUFACTURE OF POLYCARBOXYLIC ACIDS USING PHOSPHOROUS CONTAINING REDUCING AGENTS

CROSS REFERENCE TO RELATED APPLICATIONS

This application claims priority under 35 U.S.C. §119(e) to U. S. Provisional Application Ser. No. 60/330,351, filed Oct. 18, 2001.

FIELD

The present invention relates to the manufacture of polycarboxylic acid via the use of phosphorous-containing reducing agents, and in particular, to the manufacture of polycarboxylic acid cross-linking agents for use as non-formaldehyde durable press finishing agents.

BACKGROUND

Polycarboxylic acids have applicability in a wide range of fields, and in particular in the field of non-formaldehyde finishing agents. In fact, a number of references disclose the use of polycarboxylic acids for this purpose. C. Q. Yang discloses the use of maleic acid copolymers with citric acid as non-formaldehyde finishing agents in "Nonformaldehyde Durable Press Finishing of Cotton Fabrics by Combining Citric Acid with Polymers of Maleic Acid," Textile Res. J. 68:457–464. PCT publication WO 96/26314 describes the use of maleic acid oligomers for treating cellulose fabrics in the presence of sodium hypophosphite as a cross-linking catalyst.

Dicarboxylic acids such as maleic acid, fumaric acid and itaconic acid have been historically difficult to polymerize into homopolymers, unlike their mono-carboxylic acid cousins such as acrylic acid. Several publications disclose the polymerization of maleic acid via complexation with other materials such as polyvinylpyrrolidone or via the use of maleate salts with either strong bases under specialized conditions or peroxide or metal catalysts.

U.S. Pat. No. 6,277,152 and PCT publication WO 01/21677 both disclose the synthesis of polymaleic acids with phosphorous reducing agents to form phospho/maleic acid polymers for use as cotton finishing agents. Both references disclose combining maleic acid with a phosphorous reducing agent and a persulfate free radical generator to form the phospho/maleic acid polymers. However, neither of the disclosed reactions for the production of these polymers proves satisfactory. Both result in reactions that stop far short of completion and have poor color and clarity values, a less than desirable quality for finishing agents of white cotton fabrics.

Accordingly, the need remains for an improved process for the production of polycarboxylic acids using phosphorous-containing reducing agents.

SUMMARY

The present invention is directed to a method for the production of polycarboxylic acids comprising the steps of: a) mixing a phosphorous-containing reducing agent with at least one carboxylic acid monomer to form a reaction mixture; b) adding an equivalent of base to the reaction mixture to provide a partially neutralized reaction mixture; and c) adding a free radical generator to the partially neutralized reaction mixture under polymerization conditions to form a phospho/carboxylic acid polymer containing solution.

The present invention is further directed to a method for the production of polycarboxylic acids comprising the steps of: a) mixing a phosphorous containing reducing agent with at least one carboxylic acid monomer to form a reaction mixture; and b) adding a free radical generator to the reaction mixture under polymerization conditions to form a phospho/carboxylic acid polymer; wherein the reaction mixture is substantially free of color body forming transition metals.

These and other objects, features, and advantages will become apparent to those of ordinary skill in the art from a reading of the following detailed description and the appended claims.

DETAILED DESCRIPTION

All percentages, ratios and proportions herein are by weight, unless otherwise specified. All temperatures are in degrees Celsius (° C.) unless otherwise specified. All molecular weights are number average molecular weight and are measured using the procedure set forth in "Principles of Polymerization, 2$^{ND}$ Ed., Odian, G. Wiley-Interscience, 1981, pp 54–55 using mass spectrometry analysis. All documents cited are in relevant part, incorporated herein by reference.

The aforementioned need is met by the present invention where an improved process for the production of polycarboxylic acids is provided. The method of the present invention involves the reduction of carboxylic acid monomers with a phosphorous-containing reducing agent in the presence an equivalent of base prior to the addition of a free radical generator. This significant addition of the base equivalent allows the reaction of the present invention to drive to completion, thereby minimizing the amount of unsaturated carboxylic monomer in the resultant solution. The presence of elevated levels of unsaturated starting materials in the completed reaction mixture can lead to the formation of color containing bodies when the solution is employed as a textile finishing agent. In addition, it has also been discovered by Applicants that the minimization of color forming bodies in the production of the polycarboxylic acid results in substantially improved color and clarity in the textile finishes that result from the application of the polycarboxylate of the present invention as textile finishes.

The present invention provides a process for the manufacture of polycarboxylates for use as finishing agents in textile durable press finishes. The novel process described herein provides phospho/carboxylic acid polymers that have superior color and clarity than the prior art processes. Of course, superior color and clarity of the finishing agent leads to superior results in the application of the finish to white cellulosic textiles. The process of the present invention achieves these superior benefits via either of two methods and preferably a combination of both. First, the method of the present invention employs partially neutralized reaction mixtures that minimize residual unsaturated carboxylic acids in the resultant finishing agents. Unsaturated molecules in the finishing agent can lead to the formation of color forming bodies in the finished textile article. Secondly, the method of the present invention is substantially free from color body forming transition metals. Minimization of certain transition metals in the finishing agent leads to minimal formation of colored transition metal materials in the finish coat.

The present process involves the reduction of a carboxylic acid monomer with a phosphorous containing reducing agent. The initial step of the present invention involves the formation of a reaction mixture by combining the aforementioned carboxylic acid monomer with a phosphorous containing reducing agent. The carboxylic acid monomers of the present invention may be selected from a wide range of carboxylic acids but are preferably multi carboxylic acids or in other words carboxylic acids having at least two or more carboxyl groups present in the monomer. Particularly preferred monomers in the present invention include maleic acid, fumaric acid, itaconic acid, citraconic acid, mesaconic, cis-acronitic acid, transaconitic acid, 3-butene-1,2,3-tricarboxylic acid, cis-glutaconic acid, trans-glutaconic acid, trans-β-hydromuconic acid, with maleic acid being the more preferred material of the present invention. Of course, one of ordinary skill in the art will recognize that combinations of monomers are possible via the present invention.

The carboxylic acid monomer may be present at ranges of about 10% to about 75% by weight of the reaction mixture with a range of about 20% to about 30% by weight being even more preferred. The carboxylic acid monomer in the present invention is preferably present at a mole ratio of carboxylic acid monomer to phosphorous containing reducing agent is from about 1:4 to about 4:1; more preferably from about 1:2 to about 2.5:1; more preferably still from about 1:2 to about 1:1 being even more preferred.

The phosphorous containing reducing agent of the present invention may be selected from the group consisting of hypophosphorus acid and its alkali metal salts, phosphorous acid and its alkali metal salts, and mixtures thereof; with sodium hypophosphite being the more preferred. The phosphorous containing reducing agent may be present at ranges of about 5% to about 75% by weight of the reaction mixture with a range of about 10% to about 25% by weight being even more preferred.

In accordance with the first method of the present invention, the presence of unsaturated materials is minimized via driving the polymerization reaction of the present invention to completion. This is achieved via the partial neutralization of the reaction mixture by the addition of an equivalent of base prior to the addition of the free radical generator. An equivalent of base described here is defined as 1 mole of base for partially neutralizing 1 mole of maleic acid. The polymerization reaction is initiated by adding the free radical generator after partial neutralization of the carboxylic acid monomer. Preferred bases for use in the present invention include sodium hydroxide, potassium hydroxide, lithium hydroxide, calcium hydroxide, magnesium hydroxide, sodium carbonate, sodium bicarbonate, potassium carbonate and the like. During the course of the process, the pH of the mixture may change but is maintained in a pH range between 1 to 10, more preferably from 2 to 8. For purposes of the present invention, "completion" of the polymerization reaction is intended to mean that no more than 500 ppm of unreacted carboxylic acid monomer remain upon finalization of the polymerization reaction.

Following the partial neutralization, the partially neutralized reaction mixture is preferably heated to a temperature of from about 50° C. to about 110° C. and more preferably to a temperature of from about 75° C. to about 90° C. to allow the radical reaction to take place as the free radical generator produces a radical at the preferred temperature.

Following formation of the neutralized reaction mixture, a free radical generator is added to the process of the present invention to initiate the polymerization reaction. The free radical generator is preferably selected from the group consisting of sodium persulfate, potassium persulfate, ammonium persulfate, water soluble peroxides such as hydrogen peroxide, water soluble initiators such as salts of 2,2'-azoisobisbutyronitrile (e.g., 2,2'-azobis(2-methylpropionamidine) dihydrochloride), other azo-containing radical initiators, alkyl peroxides (e.g., t-butyl peroxide), aryl or diacyl peroxides (e.g., benzoyl peroxide) and mixtures thereof, more preferably sodium persulfate, potassium persulfate, ammonium persulfate, hydrogen peroxide, water soluble initiators such as salts of 2,2'-azoisobisbutyronitrile (e.g., 2,2'-azobis(2-methylpropionamidine) dihydrochloride) and mixtures thereof; more preferably potassium persulfate. The free radical generator may be present at ranges of about 0.005% to about 0.50% by weight of the reaction mixture with a range of about 0.01% to about 0.10% by weight being even more preferred. The free radical generator in the present invention is preferably present at a mole ratio of free radical generator to phosphorous-containing reducing agent of from about 0.075:1 to about 5:1, with ratios of from about 0.1:1 to about 2:1 being even more preferred.

The free radical generator may be added to the reaction mixture via any means common in the prior art but preferably is added continuously or step wise over a period of time greater than 30 minutes and more preferably greater than 60 minutes. Total reaction time for completion of the polymerization will of course vary depending upon the conditions but typically ranges from about 30 minutes to about 600 minutes with a range of from about 240 minutes to about 560 minutes being more preferred.

Following completion of the polymerization, the present invention may further comprise the optional step of the addition of a water soluble oxidizing agent such as hydrogen peroxide or other oxidant to enhance reaction completion and/or remove color bodies from (i.e., enhance clarity of) the product mixture. Other oxidizing agents include Oxone®, calcium peroxide, and sodium peroxide. The oxidizing agent may also react with unreacted monomer to further the polymerization or produce oxidized forms of maleic acid. The additional oxidizing agent such as 30% hydrogen peroxide may be added at a level of from about 10% to about 50% of the reaction mixture. Any concentration of hydrogen peroxide or other oxidizing agent may be used in this process. Upon this addition, the reaction mixture is preferably heated to a temperature of from about 60° C. to about 110° C. for a period of time of from about 30 minutes to about 120 minutes to complete removal of color bodies and consume unreacted monomer in the reaction mixture.

The product composition may also contain non-phosphorous containing polycarboxylic acids not intentionally added but artifacts of the process to produce low molecular weight polymaleates. Acids or their salts that may occur in the composition include but are not limited to maleic acid, oxydisuccinic acid, succinic acid, butantetracarboxylic acid and maleic acid. Preferred acids that may provide a benefit are oxydisuccinic acid and butanetetracarboxylic acid. Additionally, sulfate salts and sulfate adducts of maleic acid containing polymers may also be present in the product mixture.

The resultant mixture may then be employed as a superior performing non-formaldehyde finishing agent for cellulosic-based textiles.

To aid in clarity, the phospho/carboxylic acid polymers of the present invention may preferably be produced via the a non-neutralization process wherein the step of neutralizing with a base is omitted in favor of the use of a reaction mixture that is substantially free of color body forming transition metals. All other steps and limitations of the reaction then remain the same. By "substantially free" it is intended for the purposes of the present invention that the color body forming transition metals be present at levels of no greater than 100 ppm, more preferably less than about 10 ppm and more preferably less than about 3 ppm. Typical color body forming transition metals include iron, copper, manganese, cobalt and mixtures thereof. Via the minimization of these transition metals, a finishing agent is formed which upon application to a textile result in superior clarity of the finish.

To achieve such superior clarity in the resultant finish, the phospho/carboxylic acid polymer containing solution of the present invention preferably has a color/clarity of less than about 2.0 Gardner color units.

Minimizing the amount of transition metals in the process to produce the polycarboxylic acid of the present invention, minimizes discoloration and yellowing of textiles subsequently treated with the resulting polycarboxylic acid.

In addition, the present invention is preferably operated such that the resultant phospho/carboxylic acid polymer has a molecular weight of from about 110 to about 700 and more preferably from about 230 to about 600. Phospho/carboxylic acid polymer of these preferred ranges have demonstrated superior results as finishing agents for cellulose based textiles.

In another embodiment, the polycarboxylic acid containing solution resulting from the process of the present invention further includes 1,2,3,4-butanetetracarboyxlic acid (BTCA). Preferably the BTCA accounts for from about 0.1 to about 75% of the resulting polycarboxylic acid composition, more preferably from about 0.1 to about 50%, more preferably from about 0.1 to about 25%. BTCA may be purposefully added to the reaction mixture to generate the combinations and/or the BTCA could be an inherent by-product produced during the synthesis of the polycarboxylic acid composition.

EXAMPLES

The claimed invention will now be exemplified via the following non-limiting examples that one of ordinary skill in the art will recognize as merely providing illustration of the presently preferred embodiments of the invention.

Example 1

Maleic acid (55 g, 0.50 mol) is added to a 500 ml three-necked round-bottom flask fitted with a condenser, internal thermometer, magnetic stirrer, and addition funnel containing 45 ml of water. Sodium hydroxide (40 g, 0.50 mol, 50%) and sodium hypophosphite (24.6 g, 0.28 mol) are added to the reaction flask. The mixture is heated to 85° C. The reagents are treated with potassium persulfate (7.2 g, 0.27 mol) in four portions over 90 minutes. The mixture is heated for an additional 30 minutes. Hydrogen peroxide (41.4 g, 0.37 mol, 30%) is gradually added to the mixture over 3 h. Once addition is complete, the mixture is heated for 1 h at 100° C. The cooled mixture is isolated as a liquid. Analysis of the product mixture by LCMS shows the presence of mass ion peaks at 205.1, 221.1, 321.1, 337.1, 353.1 and 256.1. The structure (or isomers) for the respective mass ions are:

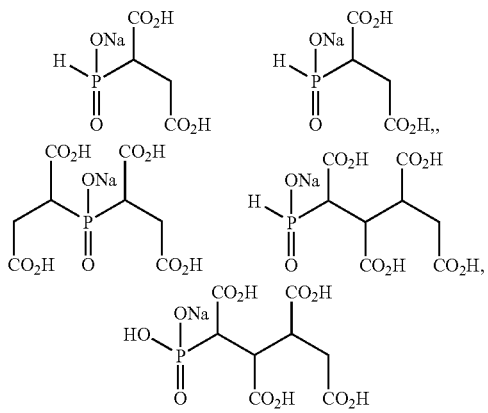

and 1,2,3,4-butanetetracarboxylic acid, respectively.

Example 2

Maleic acid (232 g, 2.0 mol) is added to a 3000 ml three-necked round-bottom flask fitted with a condenser, internal thermometer, magnetic stirrer, and addition funnel containing 600 ml of water. Sodium hypophosphite (159 g, 1.5 mol) is added to the reaction flask. The mixture is heated to 90° C. The reagents are treated with potassium persulfate (21.6 g, 0.08 mol) in four portions over 2 hours. The mixture is heated for an additional 30 minutes. Hydrogen peroxide (165 g, 1.5 mol, 30%) is gradually added to the mixture over 2 h. Once addition is complete, the mixture is heated for 2 h at 100° C. The cooled mixture is isolated as a liquid.

Example 3

Maleic acid (78 g, 0.67 mol) is added to a 45 ml three-necked round-bottom flask fitted with a condenser, internal thermometer, magnetic stirrer, and addition funnel containing 600 ml of water. Sodium hydroxide (107 g, 1.34 mol, 50%) and sodium hypophosphite (28.4 g, 0.27 mol) are added to the reaction flask. The mixture is heated to 100° C. The reagents are treated with sodium persulfate (23 g, 0.10 mol) in 33 ml of water dropwise over 2 h. The cooled mixture is isolated as a liquid.

Example 4

A 100 gallon glass-lined reactor equipped with a top mounted, motor driven agitator, hot oil jacket, vapor riser and condenser was purged with nitrogen. Cooling water was applied to the vapor riser and condenser. 362 lbs. of deionized water were charged to the reactor. Agitation was begun and continued throughout. Water heating was initiated using the jacket and hot oil heating system. When the contents of the reactor continued to heat, 146 lbs of powdered maleic acid were charged to the reactor. Followed by 83 lbs. of sodium hypophosphite. When then temperature of the reactor contents reached 68° C., a total of 13.6 lbs. of potassium persulfate was added in six increments over a period of two and a half hours, followed with 15 lbs. of deionized water to ensure complete persulfate addition. During this period, cooling was applied as needed to the hot oil loop to maintain a temperature of less than 100° C. The reaction was then continued for an additional six hours at 98° C. The reactor contents were then cooled to 56° C. and a total of 26 lbs. of 30% hydrogen peroxide were added in four increments over a three hour period. Cooling was applied to the hot oil loop as needed to maintain a temperature of less than 100° C. After the final peroxide increment was added, the reactor contents were maintained at 98° C. for an additional 2 hours before the contents were cooled and discharged. This yielded 627 lbs. of 33.7% active oligomaleate solution.

Example 5

A 100% cotton oxford fabric is passed through a treatment bath and saturated with the treatment bath solution composition. The treatment bath contains an aqueous solution containing 33% of a 25% solution of the polymaleate of Example 1 (about 8.35% of the cross-linking agents with average molecular weights between 110 and 700), 4.18% sodium hypophosphite catalyst, 0.06% tergitol TMN-6 wetting agent, and 62.3% de-ionized water. The solution bath is maintained at a pH of 2.48 and has less than 10 ppm of color body forming transition metals. The saturated cotton fabric is passed through pressurized rollers (i.e., padder, Werner-Mathis HVF-500) at 2 bars pressure and a rate of 1 meter/minute, resulting in a wet pick-up of 83.75% of treatment solution on the fabric. The fabric is dried for 2 minutes at about 85° C. in a drying oven (Werner-Mathis). The dried fabric is "pre-cured" for 3 minutes at about 180° C. in a curing oven. The resulting finished fabric was "post-washed" with an aqueous solution to remove residual salts from the finished fabric.

Example 6

A 100% cotton oxford fabric is passed through a treatment bath and saturated with the treatment bath solution composition. The treatment bath contains an aqueous solution containing 33% of a 25% solution of the polymaleate of Example 1 (about 8.35% of the cross-linking agents with average molecular weights between 110 and 700), 4.18% sodium hypophosphite catalyst, 0.06% tergitol TMN-6 wetting agent, and 62.3% de-ionized water. The solution bath is maintained at a pH of 2.48 and has less than 10 ppm of color body forming transition metals. The saturated cotton fabric is passed through pressurized rollers (i.e., padder, Werner-Mathis HVF-500) at 2 bars pressure and a rate of 1 meter/minute, resulting in a wet pick-up of 83.75% of treatment solution on the fabric. The fabric is dried for 2 minutes at 85° C. in a drying oven (Werner-Mathis). The dried fabric is "post-cured" for 2 minutes at about 180° C. while a crease was concomitantly applied to the fabric using a fabric press. The resulting finished fabric was "post-washed" with an aqueous solution to remove residual salts from the finished fabric.

Example 7

A 100% cotton oxford fabric is passed through a treatment bath and saturated with the treatment bath solution composition. The treatment bath contains an aqueous solution containing 33% of a 25% solution of the polymaleate of Example 1 (about 8.35% of the cross-linking agents with average molecular weights between 110 and 700), 4.18% sodium hypophosphite catalyst, 2% of a 35% solution of GE SM2112 silicone, 0.06% tergitol TMN-6 wetting agent, and 61.3% de-ionized water. The solution bath is maintained at a pH of 2.48 and has less than 10 ppm of color body forming transition metals. The saturated cotton fabric is passed through pressurized rollers (i.e., padder, Werner-Mathis HVF-500) at 2 bars pressure and a rate of 1 meter/minute, resulting in a wet pick-up of 83.75% of treatment solution on the fabric. The fabric is dried for 2 minutes at about 85° C. in a drying oven (Werner-Mathis). The dried fabric is "pre-cured" for 3 minutes at about 180° C. in a curing oven. The resulting finished fabric was "post-washed" with an aqueous solution to remove residual salts from the finished fabric.

Example 8

A 100% cotton oxford fabric is passed through a treatment bath and saturated with the treatment bath solution composition. The treatment bath contains an aqueous solution containing 33% of a 25% solution of the polymaleate of Example 1 (about 8.35% of the cross-linking agents with average molecular weights between 110 and 700), 4.18% sodium hypophosphite catalyst, 2% of a 35% solution of GE SM2112 silicone, 0.06% tergitol TMN-6 wetting agent, and 61.3% de-ionized water. The solution bath is maintained at a pH of 2.48 and has less than 10 ppm of color body forming transition metals. The saturated cotton fabric is passed through pressurized rollers (i.e., padder, Werner-Mathis HVF-500) at 2 bars pressure and a rate of 1 meter/minute, resulting in a wet pick-up of 83.75% of treatment solution on the fabric. The fabric is dried for 2 minutes at about 85° C. in a drying oven (Werner-Mathis). The dried fabric was given a permanent crease via a fabric press and the resulting creased fabric was "post-cured" for 2 minutes at about 180° C. The resulting finished fabric was "post-washed" with an aqueous solution to remove residual salts from the finished fabric.

Example 9

A 100% cotton oxford fabric is passed through a treatment bath and saturated with the treatment bath solution composition. The treatment bath contains an aqueous solution containing 33% of a 25% solution of the polymaleate of Example 1 (about 8.35% of the cross-linking agents with average molecular weights between 110 and 700), 4.18% sodium hypophosphite catalyst, 1% of a 35% solution of a stain repellent fluoroacrylate (e.g., Repearl F-35® available from Ashahi), 0.06% tergitol TMN-6 wetting agent, and 62.3% de-ionized water. The solution bath is maintained at a pH of 2.48 and has less than 10 ppm of color body forming transition metals. The saturated cotton fabric is passed through pressurized rollers (i.e., padder, Werner-Mathis HVF-500) at 2 bars pressure and a rate of 1 meter/minute, resulting in a wet pick-up of 83.75% of treatment solution on the fabric. The fabric is dried for 2 minutes at about 85° C. in a drying oven (Werner-Mathis). The dried fabric is "pre-cured" for 3 minutes at about 180° C. in a curing oven. The resulting finished fabric was "post-washed" with an aqueous solution to remove residual salts from the finished fabric.

Example 10

A 100% cotton oxford fabric is passed through a treatment bath and saturated with the treatment bath solution composition. The treatment bath contains an aqueous solution containing 33% of a 25% solution of the polymaleate of Example 1 (about 8.35% of the cross-linking agents with average molecular weights between 110 and 700), 4.18% sodium hypophosphite catalyst, 1% of a 35% solution of a stain repellent fluoroacrylate (e.g., Repearl F-35® available from Asahi), 0.06% tergitol TMN-6 wetting agent, and 62.3% de-ionized water. The solution bath is maintained at a pH of 2.48 and has less than 100 ppm of color body forming transition metals. The saturated cotton fabric is passed through pressurized rollers (i.e., padder, Werner-Mathis HVF-500) at 2 barrs pressure and a rate of 1 meter/minute, resulting in a wet pick-up of 83.75% of treatment solution on the fabric. The fabric is dried for 2 minutes at about 85° C. in a drying oven (Werner-Mathis). The dried fabric was cut and sewn into the form of a garment, pressed to impart permanent fabric creases and pleats, and then the completed garment was post-cured at about 180° C. for 2 minutes. The resulting finished fabric was "post-washed" with an aqueous solution to remove residual salts from the finished fabric.

Example 11

A 100% cotton, pique knit, cranberry colored fabric is passed through a treatment bath and saturated with the treatment bath solution using the "double dip, double nip" technique. The treatment bath contains an aqueous solution containing 28.38% of a 35% solution of oligomaleate, 4.96% sodium hypophosphate catalyst, 0.58% of a 52% solution of a dye fixative (Sandofix TP available from Clariant), 0.28% tergitol TMN-6 wetting agent, and 65.82% de-ionized water. The treatment bath solution is adjusted to a pH of 2.45–2.48. The saturated cotton fabric is passed through pressurized rollers (i.e., padder, Werner-Mathis HVF-500) at 2 barrs pressure and a rate of 1.5 meters/minute, resulting in a wet pick-up of 70.43% of treatment solution on the fabric. The fabric is dried for 2 minutes at about 85° C. in a drying oven (Werner-Mathis). Following the drying step, the fabric is "post-cured" in the oven for 3 minutes at about 180° C. The resulting finished fabric was "post-washed" with an aqueous solution to remove any residual salts from the finished fabric.

Example 12

Example 7 is repeated with the substitution of 50% polyester/50% cotton fabric in place of 100% cotton oxford fabric.

Example 13

A 50/50 cotton/polyester blend fabric is passed through a treatment bath and saturated with the treatment bath solution composition. Example 10 (or whatever typical example —preferably post-curing) is repeated with respect to the treatment bath composition, drying, post-washing and curing steps.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for the production of polycarboxylic acid. comprising the steps of: a) mixing a phosphorous-containing reducing agent with at least one non-phosphorous-containing carboxylic acid monomer to form a reaction mixture; b) adding an equivalent of base to the reaction mixture to provide a partially neutralized reaction mixture prior to addition of a free radical generator to the reaction mixture and prior to initiation of polymerization of the carboxylic acid monomer and the phosphorus-containing reducing agent in the reaction mixture; and c) adding a free radical generator to the partially neutralized reaction mixture under polymerization conditions to form a phospho/carboxylic acid polymer-containing solution.

2. The method of claim 1 wherein the carboxylic acid monomer has two or more carboxyl groups.

3. The method of claim 2 wherein the carboxylic acid monomer is selected from the group consisting of maleic acid, fumaric acid, itaconic acid, citraconic acid, mesaconic acid, cis-aconitic acid, trans-aconitic acid, 3-butene-1,2,3-tricarboxylic acid, cis-glutaconic acid, trans-glutaconic acid, trans-β-hydromuconic acid and mixtures thereof.

4. The method of claim 1 wherein the free radical generator is selected from the group consisting of sodium persulfate, potassium persulfate, ammonium persulfate, hydrogen peroxide, 2,2'-azobis(2-methylpropionamidine) dihydrochloride, and mixtures thereof.

5. The method of claim 1 wherein the phospho/carboxylic acid polymer containing solution has a color/clarity of less than about 2 Gardner color units.

6. The method of claim 1 wherein the phosphorous containing reducing agent is selected from the group consisting of hypophosphorus acid and its alkali metal salts, phosphorous acid and its alkali metal salts, and mixtures thereof.

7. The method of claim 6 wherein the phosphorous containing reducing agent is sodium hypophosphite.

8. The method of claim 1 wherein the mole ratio of carboxylic acid monomer to phosphorous containing reducing agent is from about 1:4 to about 4:1.

9. The method of claim 1 wherein mole ratio of free radical generator to reducing agent is from about 0.1:1 to about 2:1.

10. The method of claim 1 further comprising the step of adding hydrogen peroxide to the partially neutralized reaction mixture following the addition of the free radical generator.

11. The method of claim 1 wherein the reaction mixture is substantially free of color body forming transition metals.

12. The method of claim 1 wherein the reaction mixture has a molar ratio of carboxylic acid monomer to reducing agent of about 1:2 to about 2.5:1; and wherein the reaction mixture is substantially free of color body forming transition metals.

13. The method of claim 12 wherein the reaction mixture composition has less than 3 ppm of transition metals selected from the group consisting of iron, copper, manganese, cobalt and mixtures thereof.

14. The method of claim 12 wherein the carboxylic acid monomer has two or more carboxyl groups.

15. The method of claim 12 wherein the carboxylic acid monomer is selected from the group consisting of maleic acid, fumaric acid, itaconic acid, citraconic acid, mesaconic acid, cis-aconitic acid, trans-aconitic acid, 3-butene-1,2,3-tricarboxylic acid, cis-glutaconic acid, trans-glutaconic acid, trans-β-hydromuconic acid, and mixtures thereof.

16. A composition comprising 1,2,3,4-butanetetracarboxylic acid, and a polycarboxylic acid produced by a method comprising the steps of: a) mixing a phosphorous-containing reducing agent with at least one carboxylic acid monomer to form a reaction mixture; b) adding an equivalent of base to the reaction mixture to provide a partially neutralized reaction mixture; and c) adding a free radical generator to time partially neutralized reaction mixture under polymerization conditions to form a phospho/carboxylic acid polymer-containing solution.

17. A composition comprising 1,2,3,4-butanetetracarboxylic acid, and a polycarboxylic acid produced by a method comprising the steps of a) mixing a phosphorous-containing reducing agent with at least one carboxylic acid monomer to form a reaction mixture; and b) adding a free radical generator to the reaction mixture under polymerization conditions to form a phospho/carboxylic acid polymer; wherein the reaction mixture is substantially free of color body forming transition metals.

18. The method of claim 12, wherein the molar ratio is from about 0.5:1 to about 1:1.

19. The method of claim 12, wherein tile molar ratio is about 1.33:1.

* * * * *